United States Patent [19]

Araki

[11] Patent Number: 5,606,128
[45] Date of Patent: Feb. 25, 1997

[54] SEMICONDUCTOR ACCELERATION DETECTING DEVICE

[75] Inventor: Toru Araki, Tokyo, Japan

[73] Assignee: Mitsubishi Denki Kabushiki Kaisha, Tokyo, Japan

[21] Appl. No.: 585,256

[22] Filed: Dec. 26, 1995

[30] Foreign Application Priority Data

Jan. 30, 1995 [JP] Japan .................................. 7-013070

[51] Int. Cl.⁶ .............................. G01P 15/12; G01P 15/09
[52] U.S. Cl. ...................... 73/514.16; 73/514.33; 73/1 D
[58] Field of Search .................. 73/514.16, 1 D, 73/514.33; 338/2, 5

[56] References Cited

U.S. PATENT DOCUMENTS

| | | | |
|---|---|---|---|
| 5,415,044 | 5/1995 | Yamamoto | 73/514.33 |
| 5,460,044 | 10/1995 | Yamamoto | 73/514.16 |
| 5,499,526 | 3/1996 | Muro | 73/1 D |

FOREIGN PATENT DOCUMENTS

| | | |
|---|---|---|
| 4284644 | 10/1992 | Japan . |
| 593738 | 4/1993 | Japan . |
| 5249141 | 9/1993 | Japan . |

*Primary Examiner*—Hezron E. Williams
*Assistant Examiner*—Helen C. Kwok
*Attorney, Agent, or Firm*—Leydig, Voit & Mayer

[57] ABSTRACT

A semiconductor acceleration detecting device provided with a pedestal electrically and mechanically connected to an electrode mounted on a base with an electrically conductive adhesive, a semiconductor chip electrically and mechanically connected to the pedestal with an electrically conductive adhesive like a cantilever, and a strain gauge for detecting deformation of the semiconductor chip due to an applied acceleration. Current used for detecting detachment flows from the electrode into a wire connected to a grounding terminal through the pedestal and the semiconductor chip. Moreover, a detachment between the base and the pedestal or between the pedestal and the semiconductor chip is sensed by detecting whether the current flows normally. Thereby, erroneous acceleration of the object can be prevented from being measured.

11 Claims, 6 Drawing Sheets

SEMICONDUCTOR ACCELERATION DETECTING DEVICE

BACKGROUND OF THE INVENTION

1. Field of the Invention

This invention relates to a semiconductor acceleration detecting device and, more particularly, to a semiconductor acceleration detecting device mounted to a moving body, such as a motor vehicle, for detecting an acceleration applied thereto.

2. Description of the Related Art

FIG. 9 illustrates a known semiconductor acceleration detecting device. As shown FIG. 9, in the known semiconductor acceleration detecting device, a semiconductor chip 1 is fixed to a pedestal or a mounting bed 5 in a cantilevered manner at an end 1b thereof. Thus, the other end 1c of the semiconductor chip 1 acts as a free end or edge. The semiconductor chip 1 is made, for example, of a semiconductor material such as silicon and is flexible. Moreover, the semiconductor chip 1 is fixed by means of the pedestal 5 to a base 6 which is to be attached to an object (or a moving body) to be measured so that it is used to detect acceleration of the object. As illustrated in FIG. 9, the semiconductor chip 1 consists of a weight portion 2 provided at the one end 1c thereof serving as a free end, a thin wall portion 3 and a strain gauge 4 provided in the thin wall portion 3. The strain gauge 4 is connected with an external electrical circuit (not shown) through a wire 7. Here, note that the thin wall portion 3 is formed by reducing the thickness of a part of the semiconductor chip 1, as illustrated in this figure, so as to improve the sensitivity of the strain gauge 4 for detecting strain occurring in the semiconductor chip 1.

Hereinafter, an operation of the known semiconductor acceleration detecting device will be described. When an acceleration a is applied to the object, the acceleration a is also applied to the semiconductor chip 1 through the base 6 and the pedestal 5. Then, if M denotes the mass of the weight potion 2, a force F=ma is generated in the weight portion 2. This weight portion 2 is formed in such a manner as to be integral with the thin wall portion 3 and is further supported by the thin wall portion 3. Thus, a stress proportional to the force F is generated in the thin wall portion 3. The resistance of the strain gauge 4 changes according to this stress. Therefore, the acceleration a applied to the object is detected by converting the change in the resistance of the strain gauge 4 into an electrical signal.

As above described, in the known semiconductor acceleration detecting device, the acceleration a applied to the object is transmitted to the semiconductor chip 1 through the base 6 and the pedestal 5. Therefore, the known semiconductor acceleration detecting device has problems. When the connection or adhesion between the base 6 and the pedestal 5 or between the pedestal 5 and the semiconductor chip 1 is incomplete, the acceleration a is not accurately transmitted to the semiconductor chip 1 and an erroneous acceleration may be measured without noticing the abnormality of such an acceleration.

When the pedestal 5 is completely detached from the base 6 or the semiconductor chip 1, the acceleration a cannot be detected at all, though the acceleration a is actually applied to the object.

SUMMARY OF THE INVENTION

Accordingly, one object of the present invention is to provide a semiconductor acceleration detecting device free from the above discussed problems of the known semiconductor acceleration detecting device.

Another object of the present invention is to provide a semiconductor acceleration detecting device which can immediately detect that a connection or adhesion portion between a base and a pedestal and/or that between the pedestal and a semiconductor chip is broken (namely, the pedestal is detached from the base or the semiconductor chip), and further can inform a system or a user in advance that accurate measurement of an acceleration to be measured is impossible owing to an occurrence of such a detachment.

To achieve the foregoing object, in accordance with an aspect of the present invention, there is provided a semiconductor acceleration detecting device that comprises: a substrate which is mounted to an object to be measured and has conducting means provided thereon; a pedestal which is electrically and mechanically connected to the conducting means; a beam which is provided to the pedestal; a weight provided to the beam; acceleration detecting means, which is provided to the beam, for detecting an acceleration applied to the object according to a deflection of the weight; peeling detection constant-current-source means for feeding a peeling-detection electric current through a path consisting of the conducting means of the substrate, the pedestal and the beam; and peeling detection means for detecting a peeling occurring in a connection portion between the pedestal and the substrate and/or between the pedestal and the beam (namely, whether or not the pedestal comes ore the substrate and/or the beam) by performing a detection of the peeling-detection electric current to be fed through said path.

BRIEF DESCRIPTION OF THE DRAWINGS

The present invention will become more readily apparent from the following detailed description of the preferred embodiments of the present invention taken in conjunction with the accompanying drawings, in which.

DETAILED DESCRIPTION OF THE PREFERRED EMBODIMENTS

Hereinafter, the preferred embodiments of the present invention will be described in detail by referring to the accompanying drawings.

Embodiment 1

Figure 1:
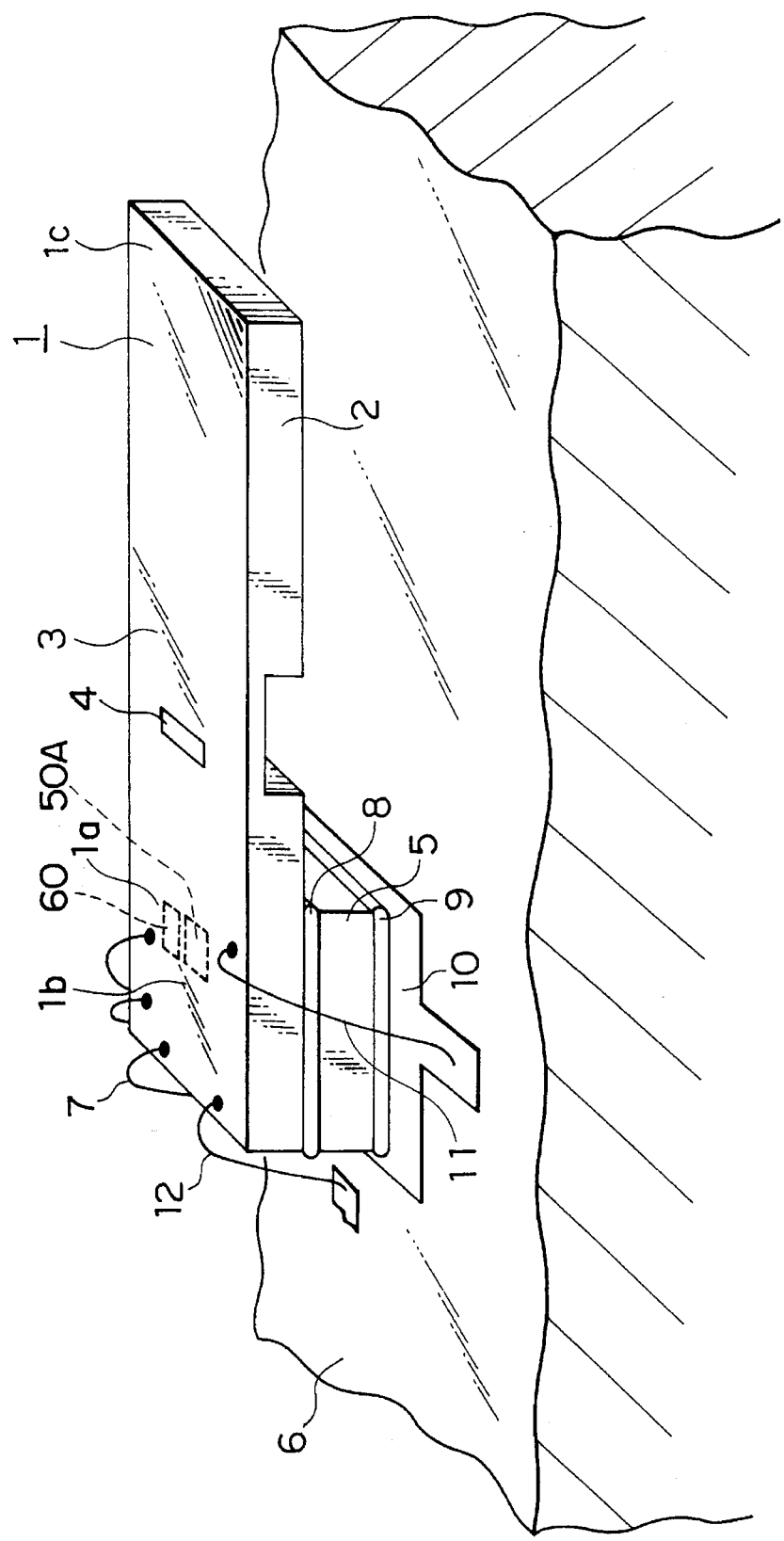
FIG. 1 is a perspective view of a semiconductor acceleration detecting device according to Embodiment 1 of the present invention.

FIG. 1 illustrates an embodiment of the present invention. As shown in this figure, this embodiment, an electrode 10 serving as a conducting means, to which a pedestal 5 for supporting a semiconductor chip 1 in a cantilever manner is securely fixed, is provided as a base 6, which is a substrate to be attached to an object to be measured. The electrode 10 is a thick film conductor made of, for example, AgPd or AgPt or the like. The pedestal 5 is a semiconductor silicon or the like, and is mechanically and electrically connected to the electrode 10 by bonding with a conductive adhesive 9 as illustrated in this figure. Further, similarly, the pedestal 5 and the semiconductor chip 1 are mechanically and electrically connected to each other by bonding with a conductive adhesive 8. Incidentally, the conductive adhesives 8 and 9 are conductive connecting means of this embodiment. For instance, epoxy resin adhesives, into which silver powder is mixed, are suitable for the conductive adhesives 8 and 9. However, the conductive adhesives 8 and 9 are not limited to the above epoxy resin adhesives. Any material having both mechanical connectability and electrical conductivity may be used as the conductive adhesives. Moreover, the material of the pedestal 5 is not limited to a semiconductor. Namely, the pedestal 5 may be made of, for example, a conductor such as a metal. As described above, the conductive adhesives 8 and 9 are used as the conductive connecting means. Thus, a manufacturing operation can be facilitated and the pedestal 5 can be bonded to the electrode 10 so firmly that detachment hardly occurs, by directly applying the conductive adhesives 8 and 9 to both the top and bottom surfaces of the pedestal 5 and the surface of the electrode 10 and curing the conductive adhesives 8 and 9 by heat treatment.

Figure 9:
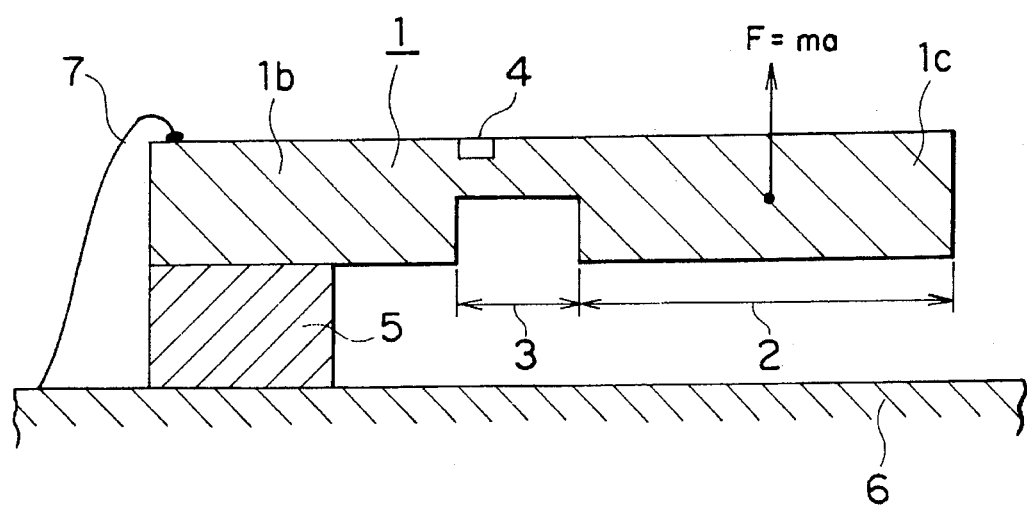
FIG. 9 is a cross sectional view illustrating the structure of the privately known semiconductor acceleration detecting device.

Further, as illustrated in FIG. 1, a wire which is connected to a constant current source 18 (see FIG. 2) and is used to feed electrical current from the constant current source 18, and a wire 12 connecting the semiconductor chip 1 with a grounding terminal 21 (see FIG. 2) are provided in the device. Moreover, in the case of this embodiment, a signal processing circuit portion 60 for converting a change in resistance, which occurs in the strain gauge 4, into an electrical signal is provided in a portion 1a of the pedestal side part of the semiconductor chip 1. The other elements of this embodiment are similar to the corresponding elements of the known device of FIG. 9. Therefore, the descriptions of those elements are omitted herein. Incidentally, the semiconductor chip 1 of this embodiment is connected to the pedestal 5 electrically and mechanically and serves a flexible beam for supporting a weight portion 2. Moreover, the strain gauge 4 acts as an acceleration detecting means for detecting an acceleration, which is applied to the object, from deflection of the weight portion 2, which is caused according to the acceleration applied to the object.

Figure 2:
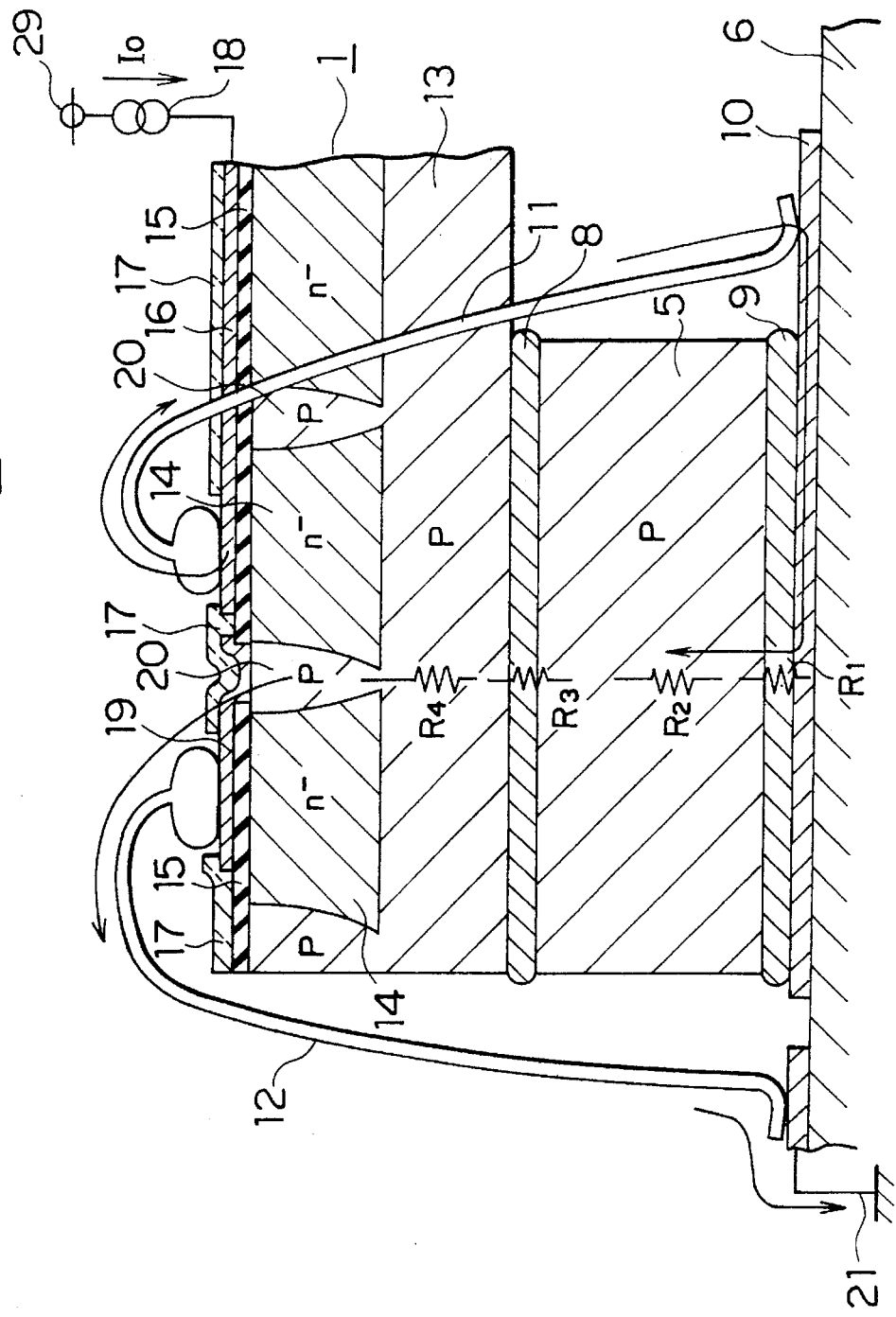
FIG. 2 is a partially cross sectional view illustrating the structure of the semiconductor acceleration detecting device of FIG. 1.

FIG. 2 is a cross sectional view for illustrating the structure of the semiconductor acceleration detecting device of FIG. 1 in detail. As shown in FIG. 2, the semiconductor chip 1 consists of a P-type substrate 13, n⁻-epitaxial regions 14 and P-type isolation regions 20, each of which is provided between n⁻-epitaxial regions 14. Further, oxide films 15 for insulation are provided on the semiconductor chip 1. Electrodes 16 and 19 are provided on the oxide films 15, respectively. The electrode 16 is made of aluminum and is connected to the wire 11. The electrode 19 is also made of aluminum and is connected to the wire 12.

Moreover, the entire top surface of the semiconductor chip 1, which contains the top surfaces of the oxide films 15 and the electrodes 16 and 19, is coated with glass layers 17 for protecting the surface thereof, except portions thereof to be connected with the wires 11 and 12 or the like. Furthermore, as above stated, the constant current source 18 for supplying an electrical current is connected to the electrode 16. The electrode 19 is connected to the grounding terminal 21 through the wire 12. Here, a power supply 29, the constant current source 18 and the grounding terminal 21 comprise a detachment detection constant-current-source means for passing a constant electrical current through the electrode 10 of the base 6, the pedestal 5 and the semiconductor chip 1.

Further, as shown in FIG. 2, reference characters R1, R2, R3 and R4 designate the resistance of the conductive adhesive 9, that of the pedestal 5, that of the conductive adhesive 8 and that of the portion consisting of the P-type substrate 13 and the P-type isolation layer 20, respectively. These reference characters are written in the figures, for convenience of description.

Hereinafter, operation of this embodiment will be described. Incidentally, an operation of detecting an acceleration of the object by use of the strain gauge 4 of this embodiment is similar to the aforementioned operation of the known device. Thus, the description of detecting an acceleration of the object by this embodiment is omitted herein. Therefore, only a detachment detection operation (namely, an operation of detecting a detachment of the adhesion portion between the base 6 and the pedestal 5 and in the adhesion portion between the pedestal 5 and the semiconductor chip 1) will be described hereinbelow. First, as illustrated in FIG. 2, an electrical current $I_0$, which is a detachment-detection constant-current issued from the constant current source 18 and used for detecting a detachment, flows into the wire 11 through the electrode 16. The wire 11 is connected to the electrode 10, so that the electrical current $I_0$ then flows into the electrode 10. Subsequently, the current $I_0$ flows from the electrode 10 through conductive adhesive 9 to the pedestal 5. Further, the current $I_0$ then flows into the P-type substrate 13 through the conductive adhesive 8. The P-type substrate 13 is connected to the electrode 19 through the P-type isolation layer 20. Thus the current $I_0$ then flows into the electrode 19. Subsequently, the current $I_0$ flows to the grounding terminal 21 through the wire 12 connected to the electrode 19. As described hereinabove, the current $I_0$ flows into the grounding terminal 21 through the pedestal 5, the P-type substrate 13 and so forth.

However, in the case where the pedestal 5 detaches from the base 6, and/or in the case where the semiconductor chip 1 detaches from the pedestal 5 the path, through which the current $I_0$ flows, is interrupted. As a result the current $I_0$ does not flow into the ground terminal 21. Thus, a detachment between the pedestal 5 and the base 6 and/or between the semiconductor chip 1 and the pedestal 5 can be easily sensed by detecting whether or not the current $I_0$ flows therethrough.

Figure 3:
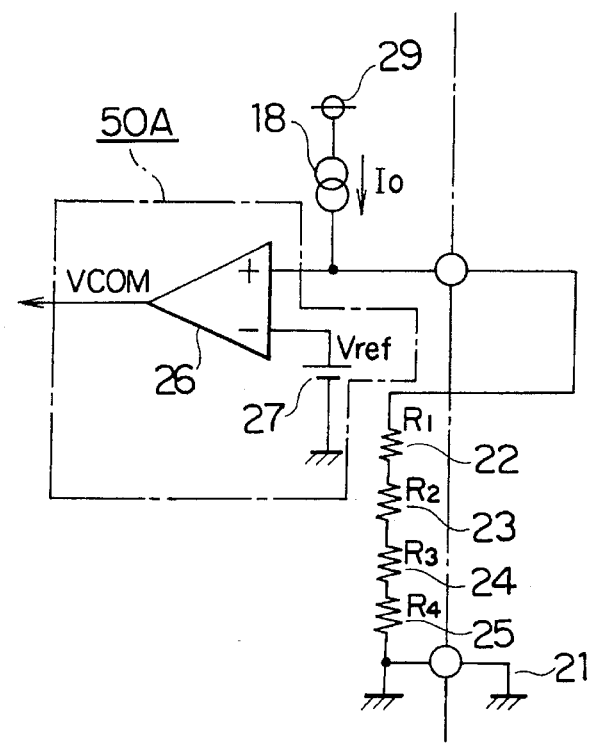
FIG. 3 is a circuit diagram illustrating the configuration of an equivalent circuit of a detachment detection means of the semiconductor acceleration detecting device of FIG. 1.

FIG. 3 illustrates the practical structure of a detachment detection means for detecting whether or not the current $I_0$ flows. The detachment detection means 50A consists of a comparator 26, which serves as a comparison judgment portion, and a reference power supply 27 which is a reference voltage generating portion for generating a reference voltage Vref. Further, the detachment detection means 50A is placed together with the aforementioned signal processing circuit portion 60 in the portion 1a of the pedestal side part of the semiconductor chip 1. In this way, in the case of this embodiment, the combination of the acceleration detecting means, which includes the strain gauge 4, and the detachment detection means is constituted by a single semiconductor chip. Thereby, the size of the device can be reduced. In this figure, reference numerals 22, 23, 24 and 25 designate resistors which correspond to the conductive adhesive 9 (whose resistance is R1), the pedestal 5 (whose resistance is R2), the conductive adhesive 8 (whose resistance is R3) and the combination of the P-type substrate 13 and the P-type isolation layer 20 (incidentally, the resistance of this combination is R4), respectively. Further, a voltage $I_0$ (R1+R2+R3+R4), which is a potential drop developed across the resistors 22 to 25 when feeding the current $I_0$ from the constant current source 18 through the resistors 22 to 25, and the reference voltage Vref outputted from the reference power supply 27 are inputted to the comparator 26. Then, the comparator 26 makes a comparison therebetween and performs a judgment. Moreover, the comparator 26 outputs a comparison judgement signal VCOM representing a result of the comparison judgment.

The resistances R1, R2, R3 and R4 of the resistors 22 to 25 depend on the materials and structures thereof. Thus, if the current $I_0$ and the reference voltage Vref are set in such a manner as to satisfy the following inequality:

$$I_0\ (R1+R2+R3+R4) > Vref \quad (1),$$

the output of the comparator 26 has a low ("L") level.

Here, note that if the pedestal 5 detaches from the base 6, then R1≈∞. Thus, the current $I_0$ and the reference voltage Vref come to satisfy the following inequality:

$$I_0\ (R1+R2+R3+R4) > Vref \quad (2).$$

As a result, the comparison judgement signal VCOM outputted from the comparator 26 has a high ("H") level.

Furthermore, if the pedestal 5 detaches from the semiconductor chip 1, then R3≈∞. Thus, in this case, the comparison judgement signal VCOM outputted from the comparator 26 has the "H" level.

In the case of this embodiment, when the comparison judgement signal VCOM output from the comparator 26 has an "H" level, the connection or adhesion portion between the pedestal 5 and the base 6 or between the pedestal 5 and the semiconductor chip 1 is broken (namely, the pedestal 5 has come off the base 6 or the semiconductor chip 1) and thus the current $I_0$ does not flow therethrough. Therefore, a system or a user using the device can easily and immediately detect occurrence of the detachment by checking the level of comparison judgement signal VCOM output from the comparator 26. Moreover, an erroneous acceleration of the object can be prevented from being measured without noticing the abnormality of such an acceleration.

Further, in the case of this embodiment, the comparison judgement between the voltage drop developed across the resistors 22 to 25 and the reference voltage Vref is performed using the comparator 26. Moreover, it is detected whether or not detachment occurs according to a result of the comparison judgement. Thereby, detachment can be accurately detected even though the resistors are produced so the resistances R1 to R4 do not have precision valves. Consequently, the manufacturing operation can be facilitated. Moreover, the device can be manufactured at a low cost.

Embodiment 2

Figure 4:
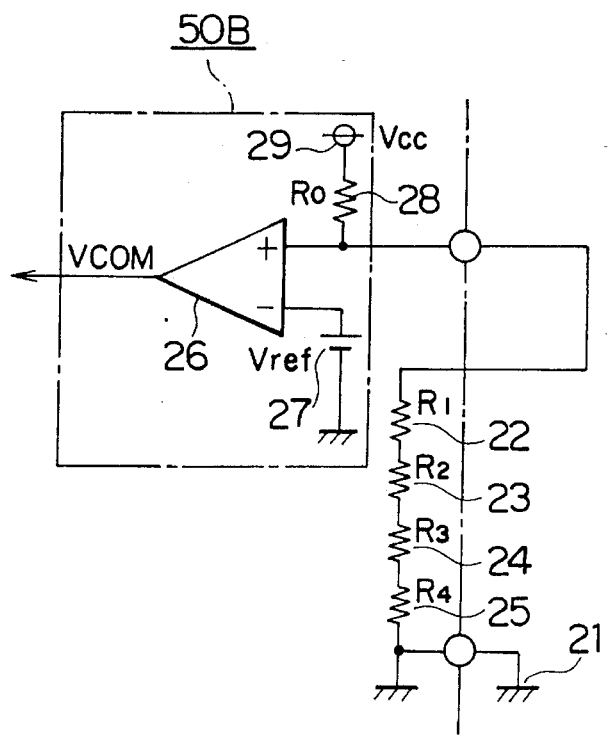
FIG. 4 is a circuit diagram illustrating the configuration of an equivalent circuit of a detachment detection means of another embodiment of the semiconductor acceleration detecting device of the present invention, namely, Embodiment 2 of the present invention.

FIG. 4 illustrates the configuration of another example of a detachment detection means for sensing detachment by detecting whether or not the current $I_0$ flows, which is provided in the semiconductor acceleration detecting device having the structure as shown in FIGS. 1 and 2. As shown in FIG. 4, the detachment detection means 50B of this embodiment, namely, Embodiment 2 is provided with a resistor 28, whose resistance is R0, instead of the constant current source 18 of FIG. 3. Moreover, in FIG. 4, reference numeral 29 denotes a power supply, with a power supply voltage, Vcc. The remaining elements of this embodiment are similar to the corresponding elements of the embodiment of FIG. 3. Here, note that the resistance R0 and the reference voltage Vref are set in such a way as to satisfy the following inequality:

$$\frac{R1+R2+R3+R4}{R1+R2+R3+R4+R0}\ Vcc < Vref\ (<Vcc). \quad (3)$$

In this case, in the comparator 26, a fractional voltage of the power supply voltage Vcc of the power supply 29, which is obtained by dividing the voltage Vcc into two fractional voltages in a ratio of the resistance of the resistor 28 to the total resistance of the resistors 22 to 25, is compared with the reference voltage Vref. Then, a comparison judgment signal VCOM representing a result of the comparison (judgement) is output from the comparator 26. Therefore, the comparison judgement signal VCOM output from the comparator 26 normally has the "L" level. However, when the pedestal 5 comes off the base 6, the resistance R1 of the conductive adhesive 9 becomes infinity. Thus, if the inequality (3) is modified and R1≈∞, the following inequality is obtained.

$$\frac{1}{1+\frac{R0}{R1+R2+R3+R4}}\ Vcc \approx Vcc > Vref \quad (4)$$

Thus, the comparison judgement signal VCOM output from the comparator 26 has the "H" level. Further, when the pedestal 5 comes off the semiconductor chip 1, the resistance R3 of the conductive adhesive 8 becomes infinity. Thus, the comparison judgement signal VCOM outputted from the comparator 26 has the "H" level.

As above described, in this Embodiment 2, as in the aforementioned Embodiment 1, when the comparison judgement signal VCOM output from the comparator 26 has the "H" level, the connection or adhesion portion between the pedestal 5 and the base 6 and/or between the pedestal 5 and the semiconductor chip 1 is broken, namely, the pedestal 5 has come off the base 6 or the semiconductor chip 1. Thus, a system or a user using the device can easily and immediately detect an occurrence of the detachment therebetween by checking the level of the comparison judgement signal VCOM output from the comparator 26. Moreover, an erroneous acceleration of the object can be prevented from being measured without noticing the abnormality of such an acceleration.

Further, this embodiment has a configuration, by which detachment can be accurately detected even though the accuracy of the resistances R0 to R4 of the resistors 22 to 25 and 28 are not so high. Consequently, the manufacturing operation can be facilitated. Moreover, the device can be manufactured at a low cost.

Embodiment 3

Figure 5:
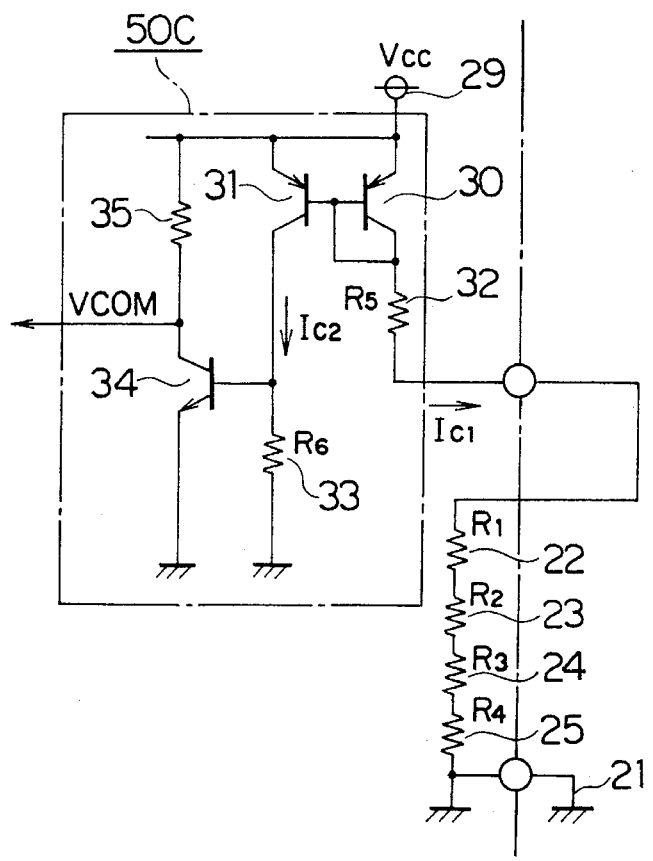
FIG. 5 is a circuit diagram illustrating the configuration of an equivalent circuit of a detachment detection means of still another embodiment of the semiconductor acceleration detecting device of the present invention, namely, Embodiment 3 of the present invention.

FIG. 5 illustrates the configuration of still another example of the peeling detection means for sensing detachment by detecting whether or not the current $I_0$ flows, which is provided in the semiconductor acceleration detecting device of the structure of FIGS. 1 and 2. As shown in FIG. 5, detachment detection means 50C of this embodiment, namely, Embodiment 3 is provided with a pair of PNP transistors 30 and 31 which have their bases and emitters, respectively, commonly connected and as a current mirror circuit. Incidentally, the PNP transistors 30 and 31 have the same size. Further, reference numeral 32 designates a resistor which is connected to the collector of the PNP transistor 30 and has resistance R5. It, however, is not necessarily required that the resistor 32 is provided in the device. The resistor 32 may be provided therein, if necessary. Furthermore, reference numeral 33 denotes a resistor which is connected to the collector of the PNP transistor 31 and has resistance R6. Additionally, an NPN transistor 34 whose base is connected to a point between the collector of the PNP transistor 31 and the resistor 33 is provided in this embodiment. Also, a load resistance 35 connected to the NPN transistor 34 is provided in this embodiment.

Here, let $V_{BE30}$ denote the base-emitter voltage of the PNP transistor 30. The collector current $Ic_1$ of the PNP transistor 30 is given by the following inequality (5):

$$Ic_1 = \frac{Vcc - V_{BE30}}{R1 + R2 + R3 + R4 + R5} \quad (5)$$

Further, the collector current $Ic_2$ of the PNP transistor 31 is given by the following inequality through the action of the current mirror circuit consisting of the pair of the PNP transistors 30 and 31:

$$Ic_2 \approx Ic_1 \quad (6)$$

Thus, a voltage drop $V_{R33}$ developed across the resistor 33 is obtained by using the inequality (5) as follows:

$$V_{R33} = Ic_2 \times R6 \approx (Vcc - V_{BE30}) \frac{R6}{R1 + R2 + R3 + R4 + R5} \quad (7)$$

Furthermore, a voltage $V_{BE}(ON)_{34}$ required to turn on the NPN transistor 34 is compared with the aforementioned voltage drop $V_{R33}$ developed across the resistor 33. Moreover, if the voltage $V_{BE}(ON)_{34}$ is set in such a manner that $V_{R33} \geq V_{BE}(ON)_{34}$, the NPN transistor 34 is normally on. Further, the collector potential of the NPN transistor 34 comes to have a low ("L") level. Namely, the collector potential of this transistor 34 comes to have the "L" level if the following inequality or condition is met:

$$V_{BE}(ON)_{34} \leq (Vcc - V_{BE30}) \frac{R6}{R1 + R2 + R3 + R4 + R5} \quad (8)$$

Incidentally, in the case of this embodiment, the output signal VCOM of the detection means 50C represents the level of this collector potential.

Here, note that when the pedestal 5 is detached from the base 6, the resistance R1 of the conductive adhesive 9 becomes infinity. Thus, the condition represented by the inequality (8) is changed as follows:

$$V_{BE}(ON)_{34} > (Vcc - V_{BE30}) \frac{R6}{R1 + R2 + R3 + R4 + R5} \quad (9)$$

Further, the NPN transistor 34 is turned off. Thus, the collector potential of the transistor 34 has a high ("H") level. Further, when the pedestal 5 comes off the semiconductor chip 1, the resistance R3 of the conductive adhesive 8 becomes infinity. As a result, the comparison judgment signal VCOM output from the comparator 26 has the "H" level. Thus, the detachment of the pedestal 5 from the base 6 or the semiconductor chip 1 can be easily detected.

Moreover, as above described, the detachment detection means 50C is configured by using the current mirror circuit.

Furthermore, the NPN transistor 34 is turned on or off according to the collector current of the current mirror circuit portion. Additionally, an output signal of the peeling detection means 50C is adapted to represent the level of the collector potential of the NPN transistor 34. Thus, this embodiment has advantages in that the configuration of the circuit can be simplified and that the device can be easily manufactured at a low cost.

Embodiment 4

Figure 6:
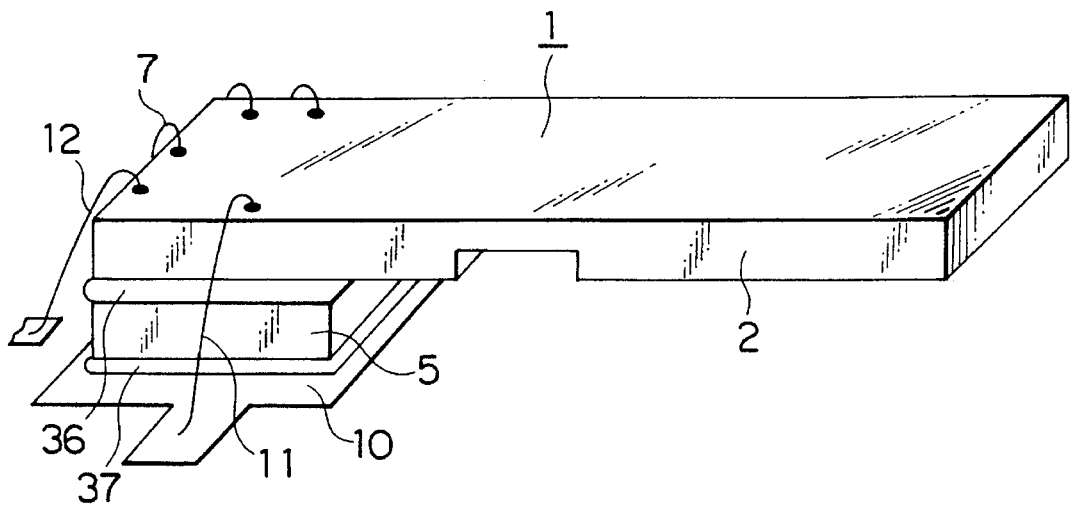
FIG. 6 is a perspective diagram illustrating the structure of another embodiment of the semiconductor acceleration detecting device of the present invention, namely, Embodiment 4 of the present invention.

FIG. 6 illustrates another embodiment, namely, Embodiment 4 of the present invention. In the case of this embodiment, the pedestal 5 is bonded to the semiconductor chip 1 and to the electrode 10 by using solder or conductive brazing filler materials 36 and 37 such as gold-silicon and gold-tin, instead of the conductive adhesives 8 and 9 of the aforementioned Embodiments 1 to 3 (see FIG. 1). In this case, it is necessary for improving the solderability and brazing-ability of the device to form metallic thin films (not shown) on the rear surface of the semiconductor chip and both of the top and bottom surfaces of the pedestal 5 by evaporation or sputtering. An example of this metallic thin film is a thin film consisting of three layers respectively made of Ti, Ni and Au. This thin film is constructed in such a manner that the outermost layer thereof is the layer made of Au which excels in solderability and brazing-ability.

Further, it is not necessarily required that the pedestal 5 be silicon. Namely, the pedestal 5 may be made of metal such as copper or iron. In such a case, it is unnecessary to apply the metallic thin films onto the surfaces of the pedestal 5. Thus, the pedestal 5 can be directly soldered or brazed thereto. Thereby, the manufacturing operation can be further facilitated.

In the case of this embodiment, the solder or the brazing filler materials 36 and 37 have the same functions as of the conductive adhesive 8 and 9 of the Embodiments 1 to 3. Thus, this Embodiment 4 can obtain effects similar to those of the Embodiments 1 to 3. Further, in the case of this Embodiment 4, the solder or the brazing filler materials 36 and 37, are used to bond the pedestal 5 to the semiconductor 1 or to the electrode 10. Thus, the device can be easily manufactured. Moreover, the time required to perform the manufacturing operation can be shortened.

Embodiment 5

Figure 7:
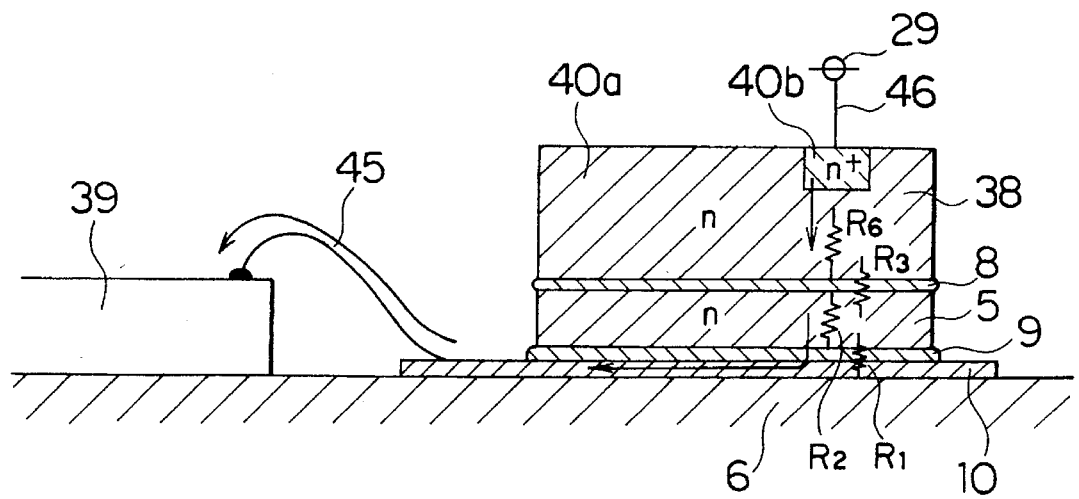
FIG. 7 is a perspective view illustrating the structure of a further embodiment of the semiconductor acceleration detecting device of the present invention, namely, Embodiment 5 of the present invention.
Figure 8:
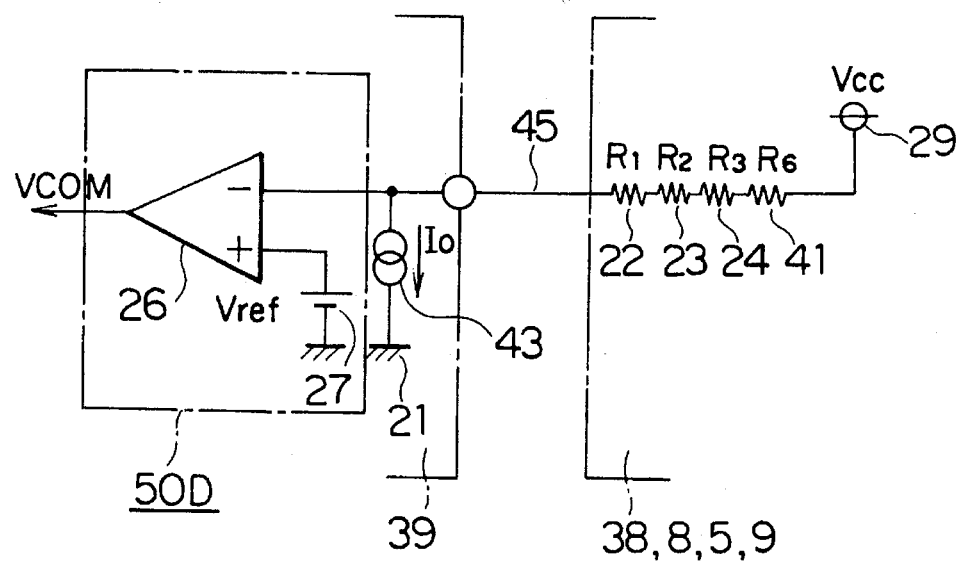
FIG. 8 is a circuit diagram illustrating the configuration of an equivalent circuit of a detachment detection means of the semiconductor acceleration detecting device of FIG. 7.

FIGS. 7 and 8 illustrate still another embodiment of the present invention. In the case of this embodiment, the semiconductor acceleration detecting device has basically the same structure as of the embodiment of FIG. 1. FIG. 7 is a cross sectional view of the device taken in a direction 90 degrees to the direction in which the cross sectional view illustrated in FIG. 2 is taken. Further, in the case of this embodiment, the acceleration detecting means and the detachment detection means are separate bodies in two different chips, respectively, and thus are separated from each other.

As illustrated in FIG. 7, in the case of this embodiment, the semiconductor acceleration detecting device comprises a semiconductor chip 38 made of silicon and an integrated circuit (IC) chip 39 including a signal processing circuit portion for converting strain, which is detected by the detachment detection means and the strain gauge 4, into an electrical signal. The semiconductor chip 38 is bonded to the pedestal 5 with the conductive adhesive 8 in a cantilever manner. Further, the weight (portion) 2 is formed at the free end (see FIG. 1) of the semiconductor chip 38. Moreover, the strain gauge 4 (see FIG. 9) is provided in the thin wall portion 3 (see FIG. 1) of the semiconductor chip 38. Furthermore, the electrode 10 bonded to the pedestal 5 is connected to the IC chip 39 with a wire 45. Additionally, in the semiconductor chip 38, an n$^+$-diffusion layer 40$b$ is formed in an n-region 40$a$. Further, the n$^+$-diffusion region 40$b$ is connected to the power supply 29 through a wire 46 such as an Al-wire (aluminium wire). Moreover, in FIG. 8, the n-layer 40$a$ of the semiconductor chip 38 is shown as a resistor 41, whose resistance is R6. Further, a inflow-type constant current source 43, the comparator 26 and the reference power supply 27 for outputting a reference voltage Vref are provided in an IC chip 39. Here, the comparator 26 and the reference power supply 27 comprise a detachment detection means 50D in the case of this embodiment.

Incidentally, in the case of this embodiment, as the result of constructing the semiconductor chip 38 by using the n-layer 40$a$, the constant current source 43 of the inflow type, into which a current $I_0$ flows, is used instead of the constant current source 18 of the outflow type of FIG. 2, from which a current flows out. Alternatively, the device may be constructed by using the constant current source 18 of the outflow type as in the embodiment of FIG. 2 in the case where the semiconductor chip 38 uses a P-type substrate. As shown in this figure, in the case of this Embodiment 5, the constant current source means for detecting detachment includes the power supply 29, the constant current source 43 and the grounding terminal 21. Further, as illustrated in FIG. 7, the current $I_0$ flows from the n-layer 40$a$ of the semiconductor chip 38 to the IC chip 39 through the conductive adhesive 8, the pedestal 5, the conductive adhesive 9, the electrode 10 and the wire 45. If the pedestal 5 comes off the base 6 and/or the semiconductor chip 38 comes off the pedestal 5, the path, through which the current $I_0$ flows, is interrupted. As a result, the current $I_0$ does not flow into the ground terminal 21. Thus, detachment between the pedestal 5 and the base 6 and/or between the semiconductor chip 38 and the pedestal 5 can be sensed by detecting whether or not the current $I_0$ flows therethrough.

When the current $I_0$ and the reference voltage Vref are preliminarily set in such a manner as to satisfy the following inequality:

$$Vcc-I_0\times(R6+R3+R2+R1)>Vref \quad (10)$$

and the voltage effect {$Vcc-I_0\times(R6+R3+R2+R1)$}, which occurs across the resistors 22, 23, 24 and 41, is compared in the comparator 26 with the reference voltage Vref, the comparison judgment signal VCOM output from the comparator 26 has a low ("L") level.

However, if the pedestal 5 detaches the base 6 hereat, the resistance R1 of the conductive adhesive 9 becomes infinity. Thus, the current $I_0$ and the reference voltage Vref satisfy the following inequality:

$$Vcc-I_0\times(R6+R3+R2+R1)<Vref \quad (11).$$

As a result, the comparison judgement signal VCOM output from the comparator 26 has a high ("H") level. Furthermore, if the pedestal 5 detaches from the semiconductor chip 1, the resistance R3 of the conductive adhesive 8 becomes infinity. Thus, the comparison judgement signal VCOM has the "H" level.

As above described, in the case of this embodiment, when the comparison judgement signal VCOM output from the comparator 26 has an "H" level, the connection or adhesion portion between the pedestal 5 and the base 6 and/or between the pedestal 5 and the semiconductor chip 38 is broken (namely, the pedestal 5 has come off the base 6 or the semiconductor chip 38), as in the case of the aforementioned Embodiment 1. Therefore, a system or a user using the device can easily and immediately detect the detachment by checking the level of the comparison judgement signal VCOM outputted from the comparator 26. Moreover, an erroneous acceleration of the object can be prevented from being measured without noticing the abnormality of such an acceleration.

Further, generally, it is difficult to manufacture the device in such a manner that the thin wall portion 3 is formed in the semiconductor chip 38 with high accuracy. As a result, the semiconductor chip 38 having the acceleration detecting means consisting of the strain gauge 4 and the thin wall portion 3 can be produced with a poor yield in comparison with the IC chip 39 having the detachment detection means. Thus, in the case where the acceleration detecting means and the detachment detection means are constituted by a single chip, both of the acceleration detecting means and the detachment detection means must be discarded if the acceleration detecting means is of poor quality even when the peeling detection means comes up to the standard. In contrast, in the case of this embodiment, the semiconductor chip 38 in which the acceleration detecting means is provided, and the IC chip 39 having the detachment detection means are separate from each other. Thus, the IC chip 39 and the semiconductor chip 38 are produced separately in the manufacturing operation or process. Further, the reliability of the IC chip 39 is tested separately from that of the semiconductor chip 38. Then, only the combination of the IC chip 39 and the semiconductor chip 38, which pass the tests, are used in the device. As a result, the necessity of discarding the detachment detection means, which passes the test, owing to the acceleration detecting means of poor reliability, can be obviated. Thereby, the number of the discarded detachment detection means can be reduced. Further, the yield of the device can be increased. Consequently, waste is eliminated from the manufacturing cost. Moreover, the price of the product can be therefore lowered.

Incidentally, in the case of each of the Embodiments 1 to 5, an acceleration detecting device of the strain detecting type, in which the semiconductor chip 1 including the beam is provided on the pedestal 5 in a cantilever manner and, moreover, the strain gauge 4 is used, is employed. The acceleration detecting device, however, is not limited thereto. An acceleration detecting device of the displacement detecting type in which an acceleration is detected according to the displacement of the beam instead of the deformation thereof can be used. Further, an acceleration detecting device of the straddle mounted type in which the beam is disposed in a straddle manner can be also used.

Although the preferred embodiments of the present invention have been described above, it should be understood that the present invention is not limited thereto and that modifications will be apparent to those skilled in the art without departing from the spirit of the invention.

The scope of the present invention, therefore, is to be determined solely by the appended claims.

What is claimed is:

1. A semiconductor acceleration detecting device comprising:

a substrate for being mounted to an object, said substrate having electrical conducting means provided thereon;

a pedestal mechanically and electrically connected to said conducting means;

a beam mounted on said pedestal;

a weight on said beam;

acceleration detecting means on said beam for detecting an acceleration applied to the object according to deflection of said weight;

a constant current source for feeding a current through a path including said substrate, said pedestal, and said beam; and detachment means for detecting detachment between said substrate and said pedestal and/or between said pedestal and said beam by detecting the current flowing through the path.

2. The semiconductor acceleration detecting device according to claim 1, further comprising electrically conductive connecting means connecting said pedestal to said substrate and to said beam.

3. The semiconductor acceleration detecting device according to claim 2, wherein said electrically conductive connecting means comprises an electrically conductive adhesive.

4. The semiconductor acceleration detecting device according to claim 2, wherein said electrically conductive connecting means comprises solder.

5. The semiconductor acceleration detecting device according to claim 2, wherein said electrically conductive connecting means comprises an electrically conductive brazing filler material.

6. The semiconductor acceleration detecting device according to claim 1, wherein said acceleration detecting means and said detachment detection means are in a single chip.

7. The semiconductor acceleration detecting device according to claim 1, wherein said acceleration detecting means and said detachment detection means are separate chips.

8. The semiconductor acceleration detecting device according to claim 1, wherein said detachment detection means comprises:

reference voltage generating means for outputting a reference voltage; and comparison judgment means for comparing a voltage depending on resistance of the path and the reference voltage and for outputting a comparison judgment signal indicating whether the current flows normally through the path.

9. The semiconductor acceleration detecting device according to claim 1, wherein said detachment detection means comprises:

a current mirror circuit having a pair of PNP transistors having collector currents varying with resistance of the path; and an NPN transistor controlled in response to the collector currents of said current mirror circuit wherein a collector potential of said NPN transistor is an output signal of said detachment detection means.

10. The semiconductor acceleration detecting device according to claim 1, wherein said pedestal comprises a semiconductor.

11. The semiconductor acceleration detecting device according to claim 1, wherein said pedestal comprises an electrical conductor.

* * * * *